G. F. McDOUGALL.
VALVE.
APPLICATION FILED DEC. 11, 1918.
1,327,564.
Patented Jan. 6, 1920.
Fig. I.
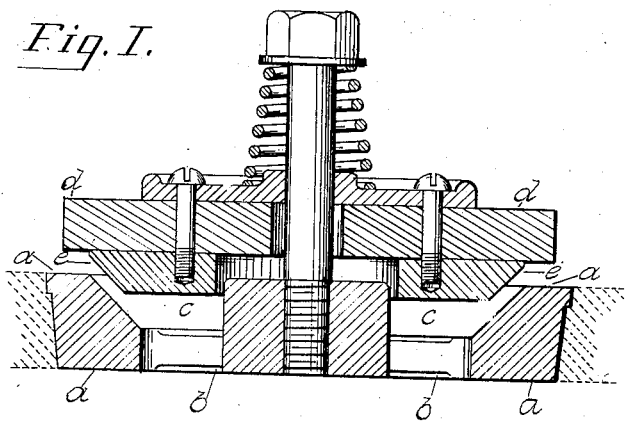
Fig. II.
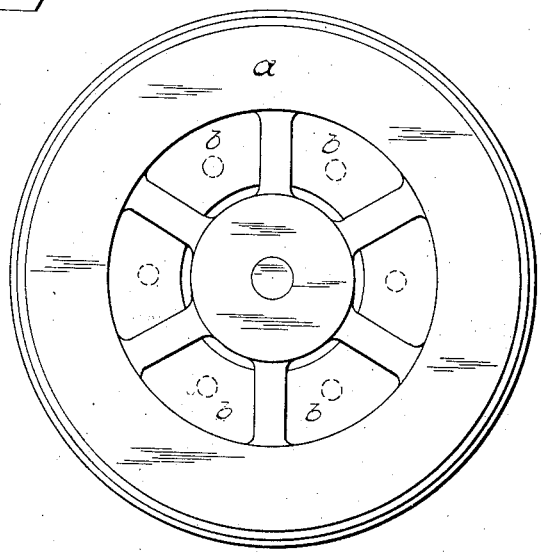
WITNESSES:
INVENTOR
George F. McDougall

UNITED STATES PATENT OFFICE.

GEORGE F. McDOUGALL, OF PORTLAND, OREGON.

VALVE.

1,327,564. Specification of Letters Patent. Patented Jan. 6, 1920.

Application filed December 11, 1918. Serial No. 266,258.

*To all whom it may concern:*

Be it known that I, G. F. McDOUGALL, a citizen of the United States, residing at Portland, in the county of Multnomah and State of Oregon, have invented a new and useful Valve, of which the following is a specification.

My invention relates to improvements in pump valves as used in reciprocating piston and plunger pumps, and check or non-return valves, intended to prevent the flow of fluid in more than one direction in pipe lines, and is a combination of a metal, and rubber valve, and possesses the principal advantages of both types of valves.

It is a well known fact that a flexible rubber valve, due to its ability to conform to a rough seat, is the most satisfactory valve for pumps of the class referred to where pressure conditions will admit of such use, but that they will be forced through the openings in the valve seat and rapidly destroyed at anything except moderate pressures.

It is also a well known fact that an all-metal valve, while capable of sustaining extreme pressure, is not flexible, and wears and cuts away rapidly, and slippage is high.

The objects of my improvement are to provide a valve which will sustain extremely heavy loads per unit of area and at the same time retain the ability of a flexible valve to conform to inequalities of the seat, and thereby, to a certain extent, overcome the disadvantages inherent in pumping water containing grit against considerable pressures.

I attain these objects by the mechanism illustrated in the accompanying drawing, in which—

Figure I is a vertical section of the complete valve shown in the position that the various parts will occupy when fluid is being discharged through it; and Fig. II is a view of the bottom of the valve seat with valve in place, tending to show the relation of the parts. Similar letters refer to similar parts throughout the several views.

The valve seat (a) is shown to be the conventional pressed in type but may be screwed into the valve deck or fastened in any other appropriate manner. This is no part of my invention. The said valve seat (a) is provided with waterways (b) and an annular opening (c) lying above the said waterways (b) and below the face or top of the said valve seat (a).

An annular metal valve (e) is so constructed as to be contained and sustained within the said opening (c), and when so contained and sustained that its upper flat surface will be parallel with the face or top of the said valve seat (a).

An annular disk valve (d) of flexible rubber or flexible substitute for rubber, whose outer diameter is greater than the outer diameter of the opening (c) in the valve seat (a), and whose inner diameter is smaller than the inner diameter of the opening (c) in the valve seat (a), is attached to the upper flat surface of the annular metal valve (e) in such manner as to completely cover the annular metal valve (e) while it is within the opening (c) in the valve seat (a), and it is apparent that when the mechanism is in a position of rest and no fluid is passing through it, that the superimposed load will be carried by the annular metal valve (e) lying within the opening (c) and that the flexible rubber, or flexible substitute for rubber, valve (d), will rest flat over and completely cover the joints between the annular metal valve (e) and the seat (a), thus preventing leakage while leaving no appreciable opening through which the flexible rubber, or flexible substitute for rubber, valve (d), can be forced and destroyed.

I have shown a conventional method of attaching the valve to the seat, applying a spring thereto, and of guiding the valve while in use, which method of attaching the valve to the seat, applying a spring thereto and guiding the valve while in use, can be varied widely without departing from the principle of my invention; and I do not claim any portion of such additional mechanism as my invention as they are well known and widely used. It will be noted that a recess is formed above the hub within the valve seat, by the construction shown. This recess is formed by the opening through the valve e closed at its upper end by the disk d and its securing gland cap placed above. This is a highly important feature, for the reason that when fluid is passing upwardly through the valve it fills this recess and, when the valve is pressed downwardly into its seat, the fluid in this recess acts as a valve cushion, being supported for this purpose upon the upper end of the hub and functioning thus before it is forced downwardly alongside thereof. The space between the hub and valve is illustrated in a somewhat more exaggerated degree than is applied in practice, but this space is of a desired width, pre-determined to accomplish the intended result. The cushioning of the valve in this manner, in actual practice, wholly obviates the knocking impact of the valve in its seat, so common in the ordinary pump valve at the end of each stroke. Moreover, this in no wise obstructs or interferes with the regular and efficient seating of the valve. It also materially lessens the wear and breaking of parts. The feature is new and useful.

I claim:

1. In a valve of the character described, the combination therein of, a valve deck having a seat and a central hub with a series of openings about the hub, a valve having a central opening of pre-determined diameter and arranged to receive the hub therein and engage the seat in a manner to allow a uniform plane of surface of the deck, the hub and the valve when seated, a disk of resilient material secured upon the upper surface of the valve in a manner to allow the joints of the valve when seated to be sealed, and the valve to carry the substantial pressure load, also at the same time providing a recess in the valve center, of pre-determined dimensions above the hub, and into which recess it is received as the valve is entering its seat, for the purposes indicated.

2. In a valve of the character described, the combination therein of, a valve deck having a seat and a central hub with a series of openings about the hub, a valve having a central opening of pre-determined diameter and arranged to receive the hub therein and engage the seat in a manner to allow a uniform plane of surface of the deck, the hub and the valve when seated, a disk of resilient material upon the valve, a gland cap having means to secure the same to the valve with the disk in rigid position between them, means to secure the valve to the hub in a manner to allow an intermittent engagement of the valve with its seat, the said valve, hub and disk being arranged with relation to each other in a manner to allow the joints of the valve when seated to be sealed, the valve to carry the substantial pressure load, and a recess of pre-determined dimensions to be provided in the valve center above the hub, and into which recess the hub is received as the valve enters its seat, for the purposes indicated.

GEORGE F. McDOUGALL.

Witnesses:
Geo. W. Berry,
H. N. Burpee.